United States Patent
Shigematsu et al.

(10) Patent No.: US 10,185,362 B2
(45) Date of Patent: Jan. 22, 2019

(54) INFORMATION PROCESSING APPARATUS, METHOD, AND PROGRAM PRODUCT FOR DISPLAYING INFORMATION UNIVIDEDLY

(71) Applicant: LENOVO (Singapore) PTE. LTD., New Tech Park (SG)

(72) Inventors: Yuichi Shigematsu, Sagamihara (JP); Atsushi Kaneko, Sagamihara (JP); Kazuo Kubota, Yokohama (JP)

(73) Assignee: Lenovo (Singapore) PTE LTD, New Tech Park (SG)

(*) Notice: Subject to any disclaimer, the term of this patent is extended or adjusted under 35 U.S.C. 154(b) by 114 days.

(21) Appl. No.: 15/258,768

(22) Filed: Sep. 7, 2016

(65) Prior Publication Data

US 2017/0075474 A1    Mar. 16, 2017

(30) Foreign Application Priority Data

Sep. 16, 2015 (JP) ................ 2015-183415

(51) Int. Cl.
*G06F 1/16* (2006.01)
*G06F 3/0485* (2013.01)
*G06F 3/0354* (2013.01)

(52) U.S. Cl.
CPC .......... *G06F 1/1641* (2013.01); *G06F 1/1643* (2013.01); *G06F 3/03543* (2013.01); *G06F 3/0485* (2013.01); *G06F 2203/0332* (2013.01)

(58) Field of Classification Search
CPC .................. G06F 1/1641; G06F 1/1643
See application file for complete search history.

(56) References Cited

U.S. PATENT DOCUMENTS

2014/0101535 A1* 4/2014 Kim ............... G06F 3/1431
                                                        715/234
2014/0101576 A1* 4/2014 Kwak ............ G06F 3/0482
                                                        715/761

FOREIGN PATENT DOCUMENTS

| JP | 06102851 A | 4/1994 |
|---|---|---|
| JP | 2001184187 A | 7/2001 |
| JP | 2012073771 A | 4/2012 |
| JP | 2012168620 A | 9/2012 |
| JP | 2012208244 A | 10/2012 |
| JP | 2013092735 A | 5/2013 |
| JP | 2014511524 | 5/2014 |
| JP | 2014151524 | 8/2014 |

* cited by examiner

*Primary Examiner* — Chun-Nan Lin
(74) *Attorney, Agent, or Firm* — Kunzler, PC

(57) ABSTRACT

An information processing apparatus includes a first display unit and a second display unit, a processor, and a memory that stores code executable by the processor. The code controls a screen display of the first display unit and a screen display of the second display unit, detects an instruction to slide a screen display of at least one of the first display unit and the second display unit, and slide the screen display of at least one of the first display unit and the second display unit in response to detecting the instruction.

14 Claims, 7 Drawing Sheets

INFORMATION PROCESSING APPARATUS, METHOD, AND PROGRAM PRODUCT FOR DISPLAYING INFORMATION UNIVIDEDLY

The subject matter disclosed herein relates to an information processing apparatus, a display method therefor, and a computer-executable program.

BACKGROUND

Among recent information processing apparatuses, there is a type that includes two touch displays (hereinafter called a "dual-screen type information processing apparatus"). In such a dual-screen type information processing apparatus, it is common to have such a structure that two touch displays are housed in respective chassis and the respective chassis are coupled by a hinge(s). Among dual-screen type information processing apparatuses, there is one capable of displaying one part of a display target (i.e., a combination of one or more texts, shapes, symbols, and/or images) on one screen and the other part of the display target on the other screen so that the two touch displays will take charge of each other's extended display areas (i.e., each display can control the other display). When a display is so provided that the two touch displays will take charge of each other's extended display areas, it is also possible to display the display target across the two touch displays.

SUMMARY

However, when two touch displays in a dual-screen type information processing apparatus are separated by the chassis or the like without being physically continuous, if a display target is displayed across the two touch displays, words and images (or other information units) that constitute the display target between the two touch displays may be dividedly displayed between the touch displays to make it difficult for a user to see because the words and images are divided. The same is true in a case where the number of touch displays is three or more.

The present embodiment has been made in view of the above problem, and it is an object thereof to provide an information processing apparatus capable of providing a display that makes it easy for a user to see divided words or images (or other information units) with a simple operation when a display target is displayed across two or more display units, and a display method therefor, and a computer-executable program.

In order to solve the above problem and achieve the above object, the present embodiment provides an information processing apparatus including: a first display unit and a second display unit; a control section configured to perform display control so that the first display unit and the second display unit will take charge of each other's extended display areas (the control section 5 can also control a screen display of the first display unit and a screen display of the second display unit); and an operation detection section configured to detect an instruction to slide a screen display of at least one of the first display unit and the second display unit, wherein when the operation detection section detects the instruction, the control section performs control to slide the screen display of at least one of the first display unit and the second display unit.

According to one preferred aspect of the present embodiment, it is desired that, when the operation detection section detects the instruction, the control section should slide the screen displays of the first display unit and the second display unit in conjunction with each other.

According to another preferred aspect of the present embodiment, it is desired that at least one of the first display unit and the second display unit should be a touch panel display unit; the instruction should be a swipe with one or more fingers on at least one of the first display unit and the second display unit, the swipe having a direction and a distance; and the direction of sliding the screen display should correspond to the direction of the swipe, and the distance of sliding the screen display should correspond to the distance of the swipe.

According to still another preferred aspect of the present embodiment, it is desired that, the control section can also detect an information unit displayed dividedly between the screen displays of the first display unit and the second display unit, and when the operation detection section detects the instruction and the control section also detects an information unit displayed dividedly between the first display unit and the second display unit, the control section should display the information unit undividedly within the screen display of the display unit corresponding to the direction of the swipe.

According to yet another preferred aspect of the present embodiment, it is desired that, when the finger is in contact with one of the first display unit and the second display unit during the swipe, the control section should maintain the state where the whole screen is slid (i.e., remember the original position of the screen display), and when the finger is released from one of the first display unit and the second display unit, the control section should return the display of the whole screen to a screen display before being slid (i.e., return the display screen to its original position).

According to a further preferred aspect of the present embodiment, it is desired to further include a first chassis adapted to house the first display unit, a second chassis adapted to house the second display unit, and a hinge adapted to coupling the first chassis and the second chassis rotatably.

In order to solve the above problem and achieve the above object, the present embodiment also provides a method, including: controlling a screen display of a first display unit and a screen display of a second display; detecting an instruction to slide a screen display of at least one of the first display unit and the second display unit, wherein in response to detecting the instruction, sliding the screen display of at least one of the first display unit and the second display unit.

In order to solve the above problem and achieve the above object, the present embodiment further provides a computer program product that includes a computer readable storage medium that stores executable code to perform the following: controlling a screen display of a first display unit and a screen display of a second display; detecting an instruction to slide a screen display of at least one of the first display unit and the second display unit, wherein in response to detecting the instruction, sliding the screen display of at least one of the first display unit and the second display unit.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1:
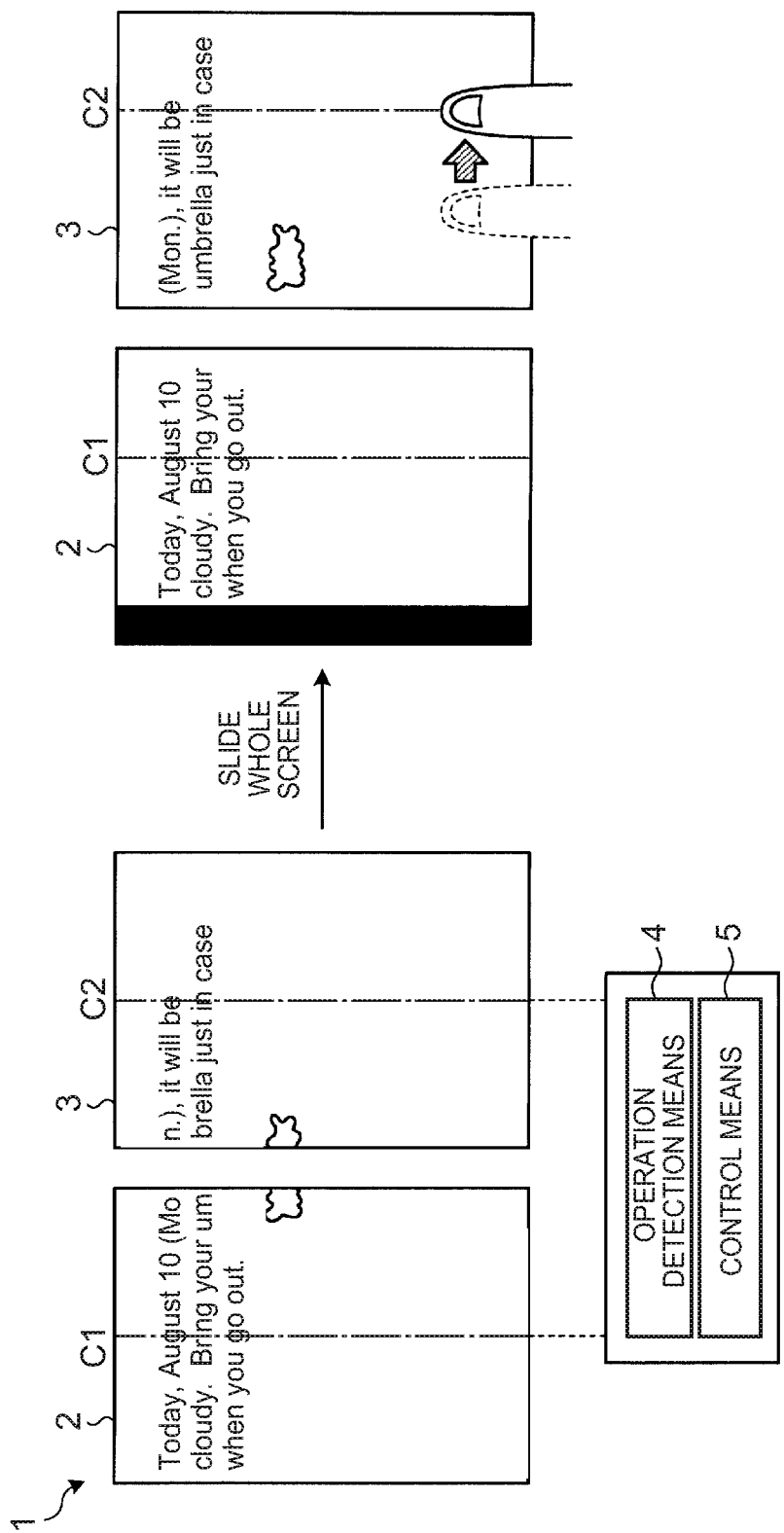
FIG. 1 is a conceptual diagram illustrating an information processing apparatus according to an embodiment.

An information processing apparatus according to an embodiment, a display method therefor, and an embodiment of a computer system to which a computer-executable program is applied will be described below. Although components of the present embodiment are illustrated in the drawings of this specification in a general way, it will be easily understood that the components can be arranged and designed in a broad range of various configurations. Therefore, more detailed description of the embodiment of the apparatus, method, and program of the present embodiment mentioned below is not intended to limit the scope of the present embodiment as set forth in the scope of claims, and is just an illustrative example of a selected embodiment of the current embodiment, i.e., just to illustrate a selected embodiment of the apparatus, system, and method without contradiction to the current embodiment as set forth in the scope of claims in this specification. It can be understood that those skilled in the art can carry out the present embodiment even if one or more specific points are absent or even using any other method, parts, and materials.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules or sections, in order to more particularly emphasize their implementation independence. For example, a module or section may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules or sections may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module or section of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

FIG. 1 is a conceptual diagram illustrating an information processing apparatus according to the embodiment. The information processing apparatus according to the embodiment can be, for example, any of various information processing apparatuses, such as a smartphone terminal, a cell-phone terminal, a tablet terminal, a laptop PC, and a game machine. In the example illustrated in FIG. 1, the screen display orientation is landscape, and a weather forecast is displayed as display information.

As illustrated in FIG. 1, an information processing apparatus 1 includes: a first display unit 2 and a second display unit 3, an operation detection section 4 configured to detect an operation, and a control section 5 configured to perform display control to have the first display unit 2 and the second display unit 3 take charge of each other's extended display areas (hereinafter, also called "display control as one screen"). In doing so, the control section 5 can control the screen display of the first display unit 2 and the screen display of the second display unit 3 simultaneously to act as a single screen. The operation detection section 4 and the control section 5 can be configured in software and/or hardware. A computer may execute a program to implement the functions of the operation detection section 4 and the control section 5.

When the operation detection section 4 detects an instruction to slide the display of the whole screen (i.e., screen display) displayed in at least one of the first display unit 2 and the second display unit 3 (hereinafter, called a "predetermined operation"), the control section 5 performs control to slide the display of the whole screen of at least one of the first display unit 2 and the second display unit 3. When the operation detection section 4 detects the predetermined operation, the control section 5 may slide the display of the whole screens of both of the first display unit 2 the second display unit 3 (see FIG. 4 and FIG. 5). In the example illustrated in FIG. 1, a case is illustrated in which the display of the whole screens of both of the first display unit 2 and the second display unit 3, with center positions C1 and C2 of display information respectively, is slid to the right.

Figure 6:
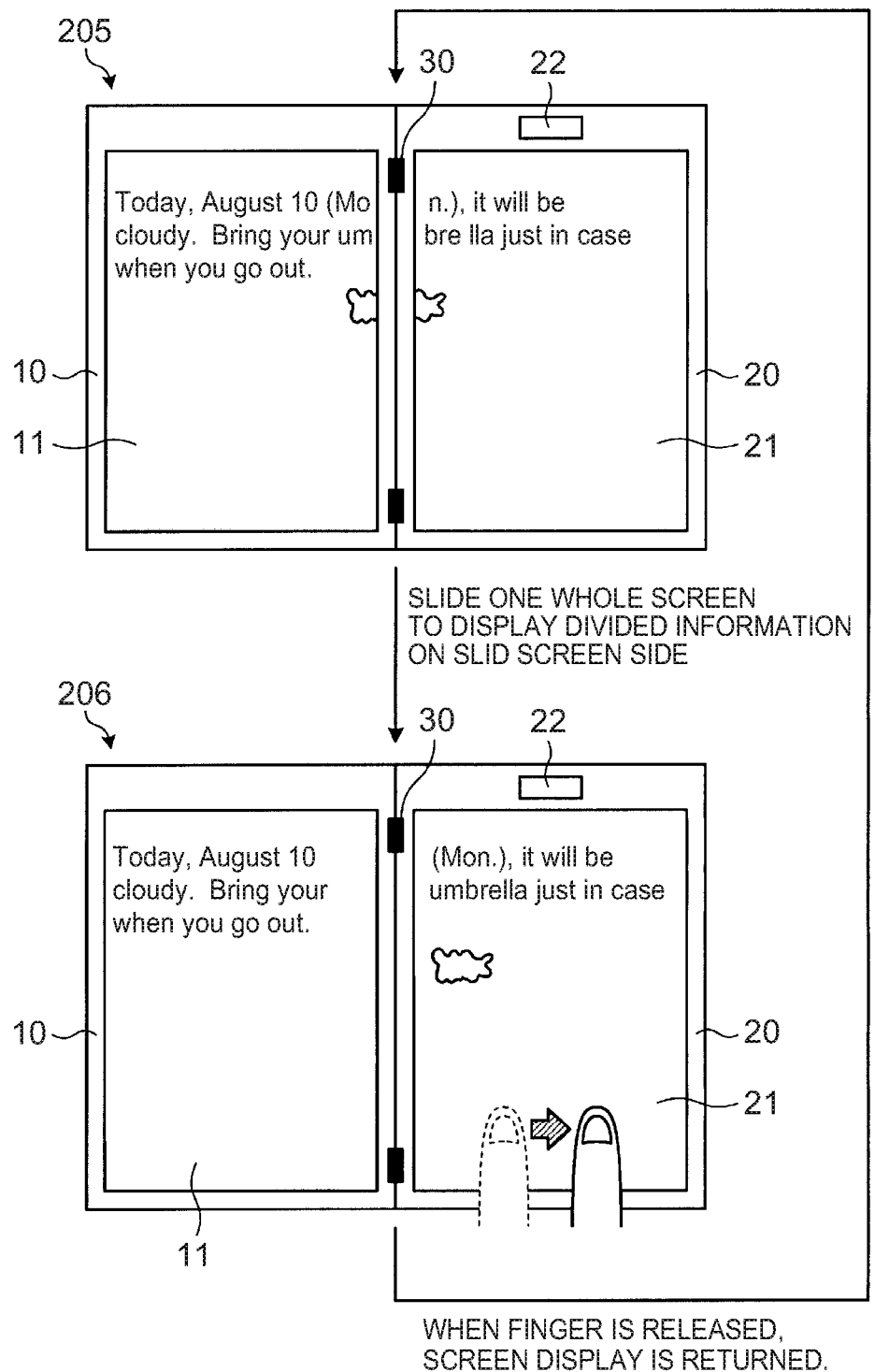
FIG. 6 is a diagram illustrating a display example for describing Example 2 of one screen display control performed by the control unit.
Figure 7:
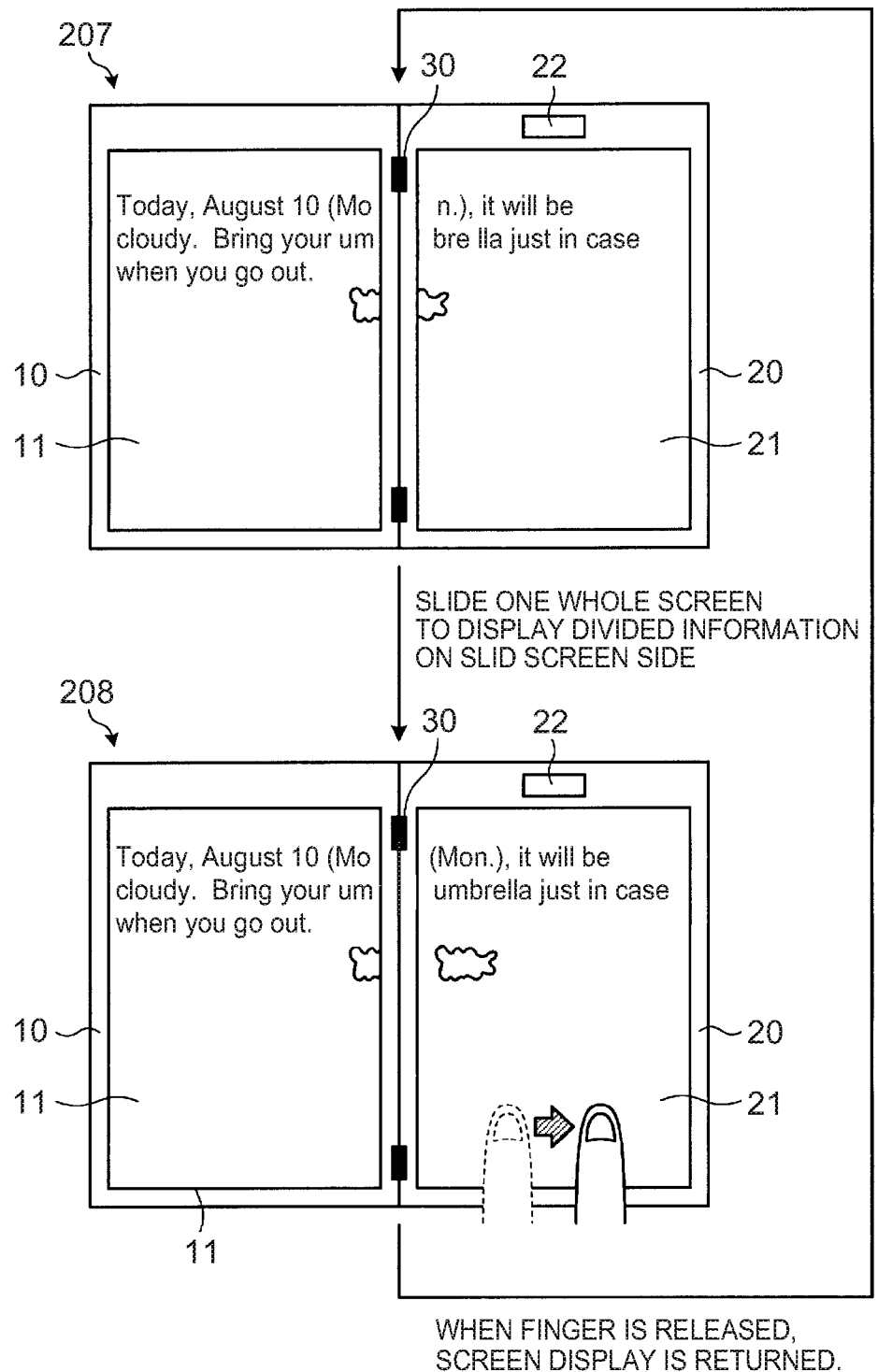
FIG. 7 is a diagram illustrating a display example for describing another example of Example 2 of one screen display control performed by the control unit.

When the operation detection section 4 detects the predetermined operation, the control section 5 may slide only the screen display of one of the first display unit 21 and the second display unit 3 (see FIG. 6 and FIG. 7).

In one instance, the control section 5 also detects that an information unit (e.g., a combination of text, shape, symbol, and/or image) is dividedly displayed between the first display unit 2 and the second display unit 3. For example, a word and/or image may be displayed between screens of the first display unit 2 and the second display unit 3. In this instance, in response to the operation detection section 4 detecting the predetermined operation, the control section 5 slides the screen display of one of the first display unit 2 and the second display unit 3 and also displays the information unit undividedly within the screen display of the display unit corresponding to the direction of the swipe.

A predetermined operation detected by the operation detection section 4 can be an operation of a keyboard or a pointing device, a voice input operation, or the like. Further, at least one of the first display unit 2 and the second display unit 3 may be configured as a touch panel display unit. In this case, the above-mentioned predetermined operation may be a slide operation (e.g., swipe) with a finger to one of the first display unit 2 and the second display unit 3 so that the direction of sliding the display of the whole screen will be the direction of the slide operation and the amount of sliding the whole screen will be an amount corresponding to an operation of the slide operation. Although the predetermined operation may be the slide operation with one finger, if it is a slide operation with two or more fingers, the predetermined operation can be distinguished from a slide operation that realizes another function. For example, swipes of different orientations (e.g., horizontal, vertical, diagonal, geometric patterns) may indicate different functions. Further, the slide operation as the predetermined operation may be a series of operations in which, after touching one point of the first display unit 2 or the second display unit 3 for a predetermined time, a user starts the slide operation from the point. Such operations can be set as the predetermined operation to distinguish the predetermined operation from a slide operation that realizes another function. Further, in the series of operations mentioned above, when the user has touched one point of the first display unit 2 or the second display unit 3 for a predetermined time, a screen display can be highlighted, such as to enlarge the screen display or change the color, or an icon can be displayed to indicate that the above series of operations are being performed to make it easy for the user to recognize that the above series of operations are being performed.

In the example illustrated in FIG. 1, a case is illustrated, in which the user performs a slide operation (e.g., swipe) with one finger to the second display unit 3 as the predetermined operation, and the control section 5 slides the display of the whole screens of both of the first display unit 2 and the second display unit 3 in the direction of the slide operation (to the right) by an amount of the slide operation to slide, to the right, the center position C1 of the screen display of the first display unit 2 and center position C2 of the screen display of the second display unit 3.

When the finger is in contact with one of the first display unit 2 and the second display unit 3 in the slide operation, the control section 5 may maintain the state where the display of the whole screen is slid (i.e., retain or store the original position of the sliding screen display in memory), while when the finger is released from one of the first display unit 2 and the second display unit 3, the control section 5 may return the display of the whole screen to the screen display before being slid (i.e., return or restore the sliding screen display to its original position).

Further, the information processing apparatus 1 may have a structure including a first chassis adapted to house the first display unit 2, a second chassis adapted to house the second display unit 3, and a hinge mechanism configured to couple the first chassis and the second chassis rotatably. Instead of the hinge mechanism, the structure may be equipped with a slide mechanism adapted to slide the first chassis and the second chassis relative to each other. Further, a display device of a computing apparatus and an external display device may be used to perform display control as one screen. In this case, the predetermined operation may be an operation using a keyboard, a pointing device, or voice.

As described above, according to the embodiment, the information processing apparatus includes the first display unit 2 and the second display unit 3, the operation detection section 4 configured to detect an operation, and the control section 5 configured to perform display control to make the first display unit 2 and the second display unit 3 act as a single screen. When the operation detection section 4 detects an instruction to slide the screen display of at least one of the first display unit 2 and the second display unit 3, the control section 5 performs control to slide the display of the whole screen of at least one of the first display unit 2 and the second display unit 3. Therefore, when a display target is displayed across two or more display units, the display target can be displayed with a simple operation in a manner easy for a user to see.

In addition, when the display target is displayed as one screen in the first display unit 2 and the second display unit 3, the user can slide the display of the whole screen to change the display position of display information on the screen. For example, even when the information is dividedly displayed between the first display unit 2 and the second display unit 3, the user can slide the display of the whole screen to check the whole of the divided information on one screen. This can provide a display easy for the user to see.

EXAMPLES

Figure 2:
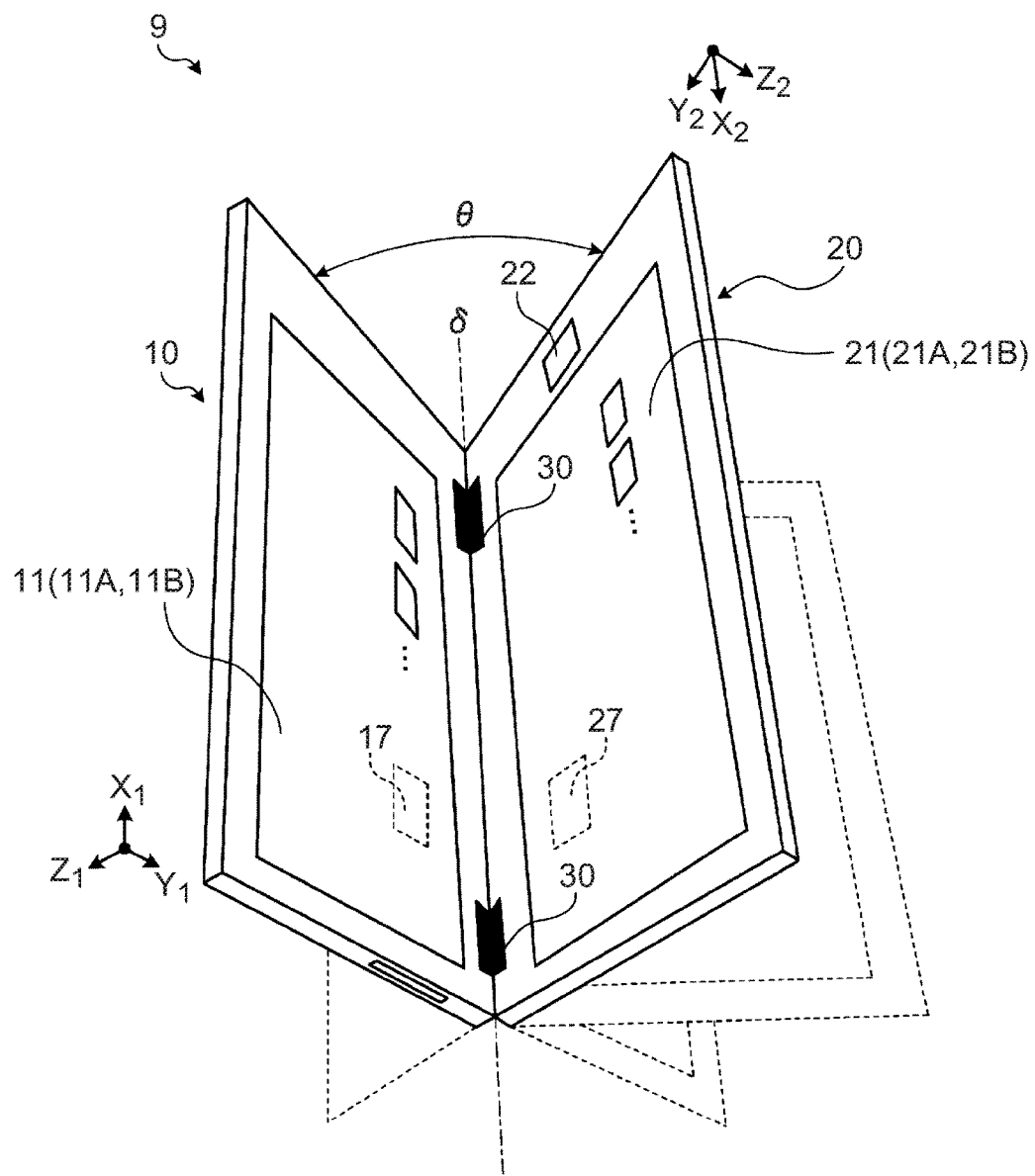
FIG. 2 is a schematic perspective view illustrating the appearance structure of a portable terminal device according to the embodiment.

A case where the information processing apparatus according to the embodiment is applied to a dual-screen type portable terminal device will be described as one example. FIG. 2 is a schematic perspective view illustrating the appearance structure of a portable terminal device according to this example.

As illustrated in FIG. 2, a portable terminal device 9 according to the example includes a first chassis 10 and a second chassis 20. The portable terminal device 9 also includes hinges (coupling parts) 30 between the first chassis 10 and the second chassis 20.

The first chassis 10 has a substantially rectangular shape, and a first touch display unit 11, composed of a first display unit 11B and a first touch panel 11A placed on the first display unit 11B, is placed in the first chassis 10. Arranged inside the first chassis 10 is a first acceleration sensor 17 configured to detect acceleration with respect to the first chassis 10 (touch display unit 11) in an $X_1$ direction parallel to the longitudinal direction of the first chassis 10, in a $Y_1$ direction parallel to the widthwise direction thereof, and in a $Z_1$ direction normal to the $X_1$ and $Y_1$ directions.

The second chassis 20 has a substantially rectangular shape, and a second touch display unit 21, composed of a second touch display unit 21B and a second touch panel 21A placed on the second touch display unit 21B, is placed in the second chassis 20. Arranged inside the second chassis 20 is a second acceleration sensor 27 configured to detect acceleration with respect to the second chassis 20 (touch display unit 21) in an $X_2$ direction parallel to the longitudinal direction of the second chassis 20, in a $Y_2$ direction parallel to the widthwise direction thereof, and in a $Z_2$ direction normal to the $X_2$ and $Y_2$ directions.

The hinges 30 rotatably couple the first chassis 10 and the second chassis 20. The angle between the first chassis 10 and the second chassis 20 with respect to a rotating axis 6 (the angle of the first chassis 10 with respect to the second chassis 20) is defined as "0." To be more specific, the hinges 30 couple the first chassis 10 and the second chassis 20 to be rotatable substantially at 360 degrees about the rotating axis 6. The portable terminal device 9 can take various states depending on the hinges 30. The angle $\theta=0$ is called a closed state, the angle of $0<\theta<180$ is called a clamshell state, the angle $\theta=180$ is called a tablet state, the angle of $180<\theta<360$ is called a tent state, and the angle $\theta=360$ is called a basic state. In the portable terminal device 9, the various states of the portable terminal device 9 mentioned above can be detected based on the detection results of the first acceleration sensor 17 and the second acceleration sensor 27.

Figure 3:
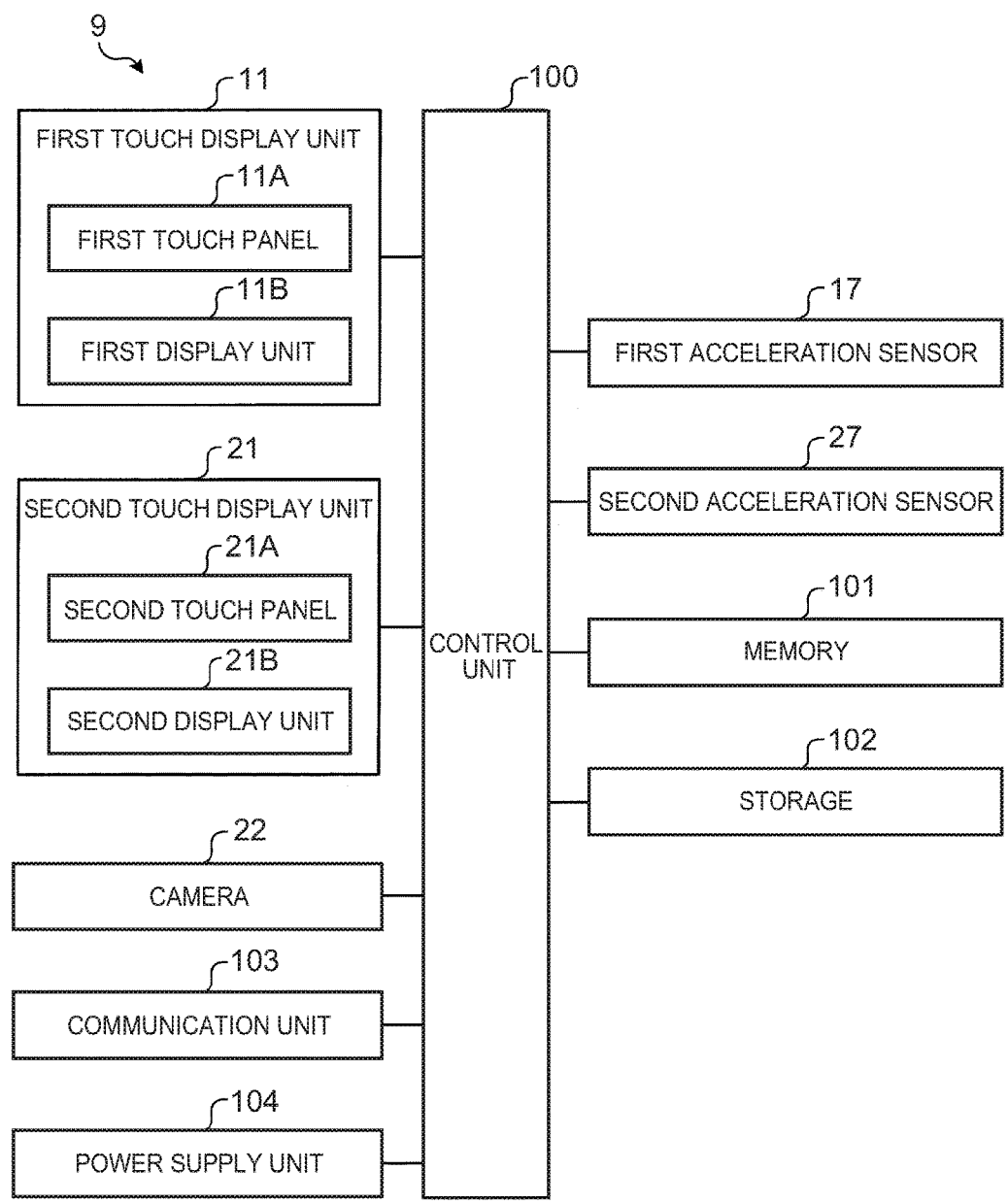
FIG. 3 is a block diagram illustrating a schematic hardware configuration example of the portable terminal device according to one example.

FIG. 3 is a block diagram illustrating a schematic hardware configuration example of the portable terminal device 9 according to the example. As illustrated in FIG. 3, the portable terminal device 9 includes the first touch display unit 11, the second touch display unit 21, a control unit 100, a memory 101, a storage 102, the first acceleration sensor 17, the second acceleration sensor 27, a camera 22, a communication unit 103, and a power supply unit 104.

The first touch display unit 11 has the first display unit 11B and the first touch panel 11A superimposed on the first display unit 11B. The first touch panel 11A is, for example, a capacitive multi-touch panel configured to detect various operations, performed on the first touch panel 11A using a pointing body such as a finger or a pen, together with positions on the first touch panel 11A where the operations have been performed, and notifies the control unit 100 thereof. The operations detected by the first touch panel 11A include a touch operation, a tap operation, a slide operation, a pitch operation, a swipe operation, and the like. The first display unit 11B is, for example, a liquid crystal display (LCD) or an organic EL (Electro-Luminescence) panel to display words and graphics under the control of the control unit 100.

The second touch display unit 21 has the second touch display unit 21B and the second touch panel 21A superimposed on the second touch display unit 21B. The second touch panel 21A is, for example, a capacitive multi-touch panel configured to detect various operations, performed on the second touch panel 21A using a pointing body such as a finger or a pen, together with positions on the second touch panel 21A where the operations have been performed, and notifies the control unit 100 thereof. The operations detected by the second touch panel 21A include a touch operation, a tap operation, a slide operation, a pitch operation, a swipe operation, and the like. The second touch display unit 21B is, for example, a liquid crystal display (LCD) or an organic EL (Electro-Luminescence) panel to display words and graphics under the control of the control unit 100.

The communication unit 103 is a device for wireless/wired data communication with the outside under the control of the control unit 100. The power supply unit 104 supplies, to each unit of the portable terminal device 9 including the control unit 100, power from a rechargeable battery or an AC adapter under the control of the control unit 100. The camera 22 outputs, to the control unit 100, image data captured by imaging a subject.

The first acceleration sensor 17 detects acceleration with respect to the first touch display unit 11 in the $X_1$ direction parallel to the longitudinal direction of the first touch display unit 11, in the $Y_1$ direction parallel to the widthwise direction thereof, and in the $Z_1$ direction normal to the $X_1$ and $Y_1$ directions, and outputs, to the control unit 100, acceleration values $Ax_1(t)$, $Ay_1(t)$, and $Az_1(t)$ in the $X_1$, $Y_1$, and $Z_1$ directions.

The second acceleration sensor 27 detects acceleration with respect to the second touch display unit 21 in the $X_2$ direction parallel to the longitudinal direction of the second touch display unit 21, in the $Y_2$ direction parallel to the widthwise direction thereof, and in the $Z_2$ direction normal to the $X_2$ and $Y_2$ directions, and outputs, to the control unit 100, acceleration values $Ax_2(t)$, $Ay_2(t)$, and $Az_2(t)$ in the $X_2$, $Y_2$, and $Z_2$ directions.

The memory 101 is, for example, a RAM or a DRAM used as a working area, in which a program executed by the control unit 100, data referred to by the control unit 100, the computing results of the control unit 100, and the like are temporarily stored.

The storage 102 is a computer-readable storage medium for storing programs executed by the control unit 100 and data, which is a nonvolatile memory such as an EEPROM, an SSD, or a hard disk. The storage 102 has the functions of storing an OS for entire control of the portable terminal device 9, such as Windows™, MacOS™, iOS™, Android™, or the like, device drivers for manipulating hardware peripheral devices, and various apps such as a Mail app, a browser app, and an app for electronic book browsing. The OS intervenes in all data transfer between the various device drivers and various apps.

The control unit 100 is, for example, a CPU (Central Processing Unit), a microprocessor, a DSP, or the like to centrally control the operation of the portable terminal device 9 to realize the various functions. Specifically, the control unit 100 executes a command contained in a program stored in the storage 102 while referring to data stored in the storage 102 or data developed in the memory 101 as needed to implement each of the various functions such as the input function, the mailing function, the web browsing function, and the display function.

Further, based on the acceleration values $Ax_1(t)$, $Ay_1(t)$, and $Az_1(t)$ in the $X_1$, $Y_1$, and $Z_1$ directions detected by the first acceleration sensor 17, and the acceleration values $Ax_2(t)$, $Ay_2(t)$, and $Az_2(t)$ in the $X_2$, $Y_2$, and $Z_2$ directions detected by the second acceleration sensor 27, the control unit 100 detects the above various states of the portable terminal device 9, and the orientations of the screens of the first touch display unit 11 and the second touch display unit 21. The control unit 100 rotates the display direction of the screens depending on the detected orientations of the screens in the first touch display unit 11 and the second touch display unit 21 to provide a landscape display (with the widthwise directions of the first touch display unit 11 and the second touch display unit 21 set upward) or a portrait display (with the longitudinal direction of the first touch display unit 11 or the second touch display unit 12 set upward).

Further, the control unit 100 performs display control to display the first touch display unit 11 and the second touch display unit 21 as one screen (hereinafter, called "one screen display control"). In one screen display control, the control unit 100 may slide the whole screen of at least one of the first touch display unit 11 and the second touch display unit 12. In the following examples, description will be made by exemplifying the case of a landscape display when the portable terminal device 9 is in the tablet state.

Example 1

Figure 4:
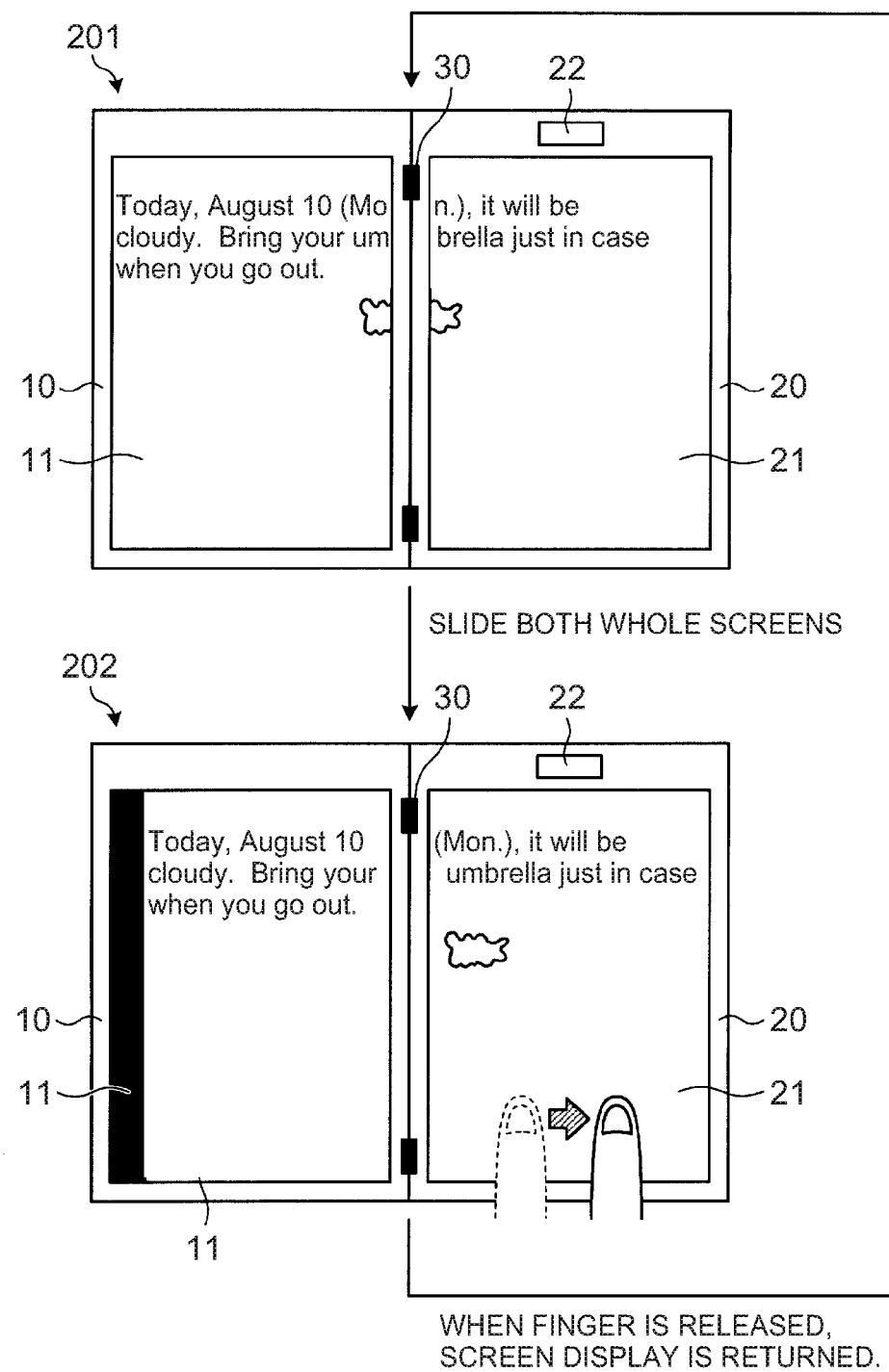
FIG. 4 is a diagram illustrating a display example for describing Example 1 of one screen display control performed by a control unit.
Figure 5:
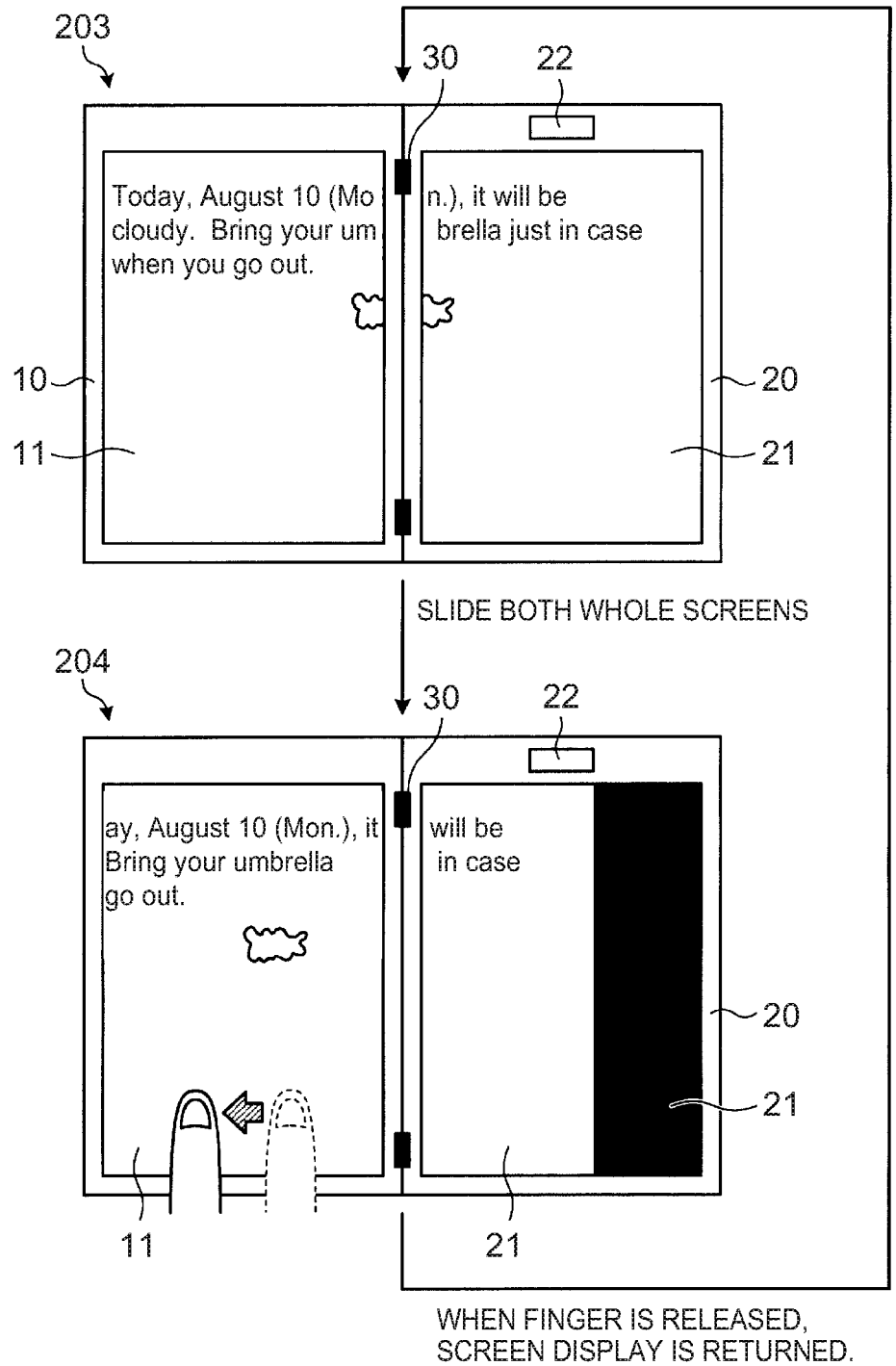
FIG. 5 is a diagram illustrating a display example for describing Example 1 of one screen display control performed by the control unit.

Referring to FIG. 4 and FIG. 5, Example 1 of one screen display control performed by the control unit 100 will be described. When a predetermined operation is detected in the first touch display unit 11 and the second touch display unit 21, the control unit 100 may slide the display of the screen displays of both of the first display unit 11 and the second touch display unit 21.

For example, the predetermined operation is a slide operation with one or more fingers to one of the first touch display unit 11 and the second touch display unit 21. When the slide operation to one of the first touch display unit 11 and the second touch display unit 21 is detected, the control unit 100 may slide the screen displays of both of the first touch display unit 11 and the second touch display unit 21 in the direction of the slide operation by an amount corresponding to the amount of the slide operation. In the following display examples, description will be made by exemplifying the case of a slide operation with one finger.

Further, when the finger is in contact with one of the first touch display unit 11 and the second touch display unit 21 in the slide operation, the control unit 100 may maintain the original state of the display of both whole screens, and when the finger in contact is released from the first display unit 11 or the second touch display unit 21, the control unit 100 may return the display of the screens to their pre-slide state.

FIG. 4 is a diagram illustrating a display example in which the display of two whole screens subjected to one screen display control is slid to the right. As illustrated in a display example 201 of FIG. 4, a weather forecast is displayed as one screen in the first touch display unit 11 and the second touch display unit 21. Here, the words "(Mon.)" and "umbrella" and an image of a cloud are dividedly displayed across the first touch display unit 11 and the second touch display unit 21.

Here, as illustrated in a display example 202, when the user performs a slide operation with a finger to slide the second touch display unit 21 to the right, the control unit 100 slides the screen displays of both of the first touch display unit 11 and the second touch display unit 21 to the right in the direction of the slide operation by an amount corresponding to the amount of slide operation. When it is difficult for the user to see divided information, for example, the words "(Mon.) and "umbrella" and an image of a cloud, the user can slide the second touch display unit 21 with a finger slightly to the right to check the whole of the divided information, i.e., the whole of the words "(Mon.) and "umbrella" and an image of a cloud in the second touch display unit 21.

When the finger is in contact with the second touch display unit 21 in the slide operation, the control unit 100 maintains the state where both whole screens are slid. Then, when the user releases the finger from the second touch display unit 21, the control unit 100 returns the display of both whole screens to the screen display (display example 201) of their pre-slide state.

Here, although the display of the whole screens of both of the first touch display unit 11 and the second touch display unit 21 is slid to the right when the second touch display unit 21 is slid to the right, the display of the whole screens of both of the first touch display unit 11 and the second touch display unit 21 may be slid to the right when the first touch display unit 11 is slid to the right.

FIG. 5 is a diagram illustrating a display example in which the display of two whole screens subjected to one screen display control is slid to the left. In a display example 203 of FIG. 5, displayed information is the same as that in the display example 201 of FIG. 4. As illustrated in a display example 204, when the user performs a slide operation with a finger to slide the first touch display unit 11 to the left, the control unit 100 slides the display of the whole screens of both of the first touch display unit 11 and the second touch display unit 21 to the left in the direction of the slide operation by an amount corresponding to the operation amount of the slide operation. When the finger is in contact with the first touch display unit 11 in the slide operation, the control unit 100 maintains the state where both whole screens are slid. Then, when the user releases the finger from the first touch display unit 11, the control unit 100 returns the display of both whole screens to the screen display (display example 203) of their pre-slide state.

Here, although the display of the whole screens of both of the first touch display unit 11 and the second touch display unit 21 is slid to the left when the first touch display unit 11 is slid to the left, the display of the whole screens of both of the first touch display unit 11 and the second touch display unit 21 may be slid to the left when the second touch display unit 21 is slid to the left.

In Example 1, when the predetermined operation is detected, the display of the whole screens of both of the first touch display unit 11 and the second touch display unit 21 is slid. This is effective in sliding the center positions of display information on both screens.

Example 2

Referring to FIG. 6, Example 2 of one screen display control performed by the control unit 100 will be described. When a predetermined operation is detected in the first touch display unit 11 and the second touch display unit 21, the control unit 100 detects information dividedly displayed between the first touch display unit 11 and the second touch display unit 21 to slide the display of the whole screen of one of the first touch display unit 11 and the second touch display unit 21, and when the divided information is detected, the whole of dividedly displayed information may be displayed on a slid screen side. When there is no divided information, the control unit 100 may perform only the processing for sliding the display of one whole screen.

For example, the predetermined operation is a slide operation with a finger to one of the first touch display unit 11 and the second touch display unit 21. When the slide operation to one of the first touch display unit 11 and the second touch display unit 21 is detected, the control unit 100 may slide the display of the whole screen of the touch display unit, on which the slide operation has been performed, in the direction of the slide operation by an amount corresponding to the amount of slide operation.

When the finger is in contact with one touch display unit in the slide operation, the control unit 100 may maintain the state where the display of the whole screen is slid, while when the finger in contact is released from the touch display unit, the control unit 100 may return the display of the whole screen to the screen display of their pre-slide state.

FIG. 6 is a diagram illustrating a display example in which the display of one whole screen of two screens subjected to one screen display control is slid. As illustrated in a display example 205 of FIG. 6, a weather forecast is displayed as one screen in the first touch display unit 11 and the second touch display unit 21. Here, the words "(Mon.) and "umbrella" and an image of a cloud are dividedly displayed across the first touch display unit 11 and the second touch display unit 21.

Here, as illustrated in a display example 206, when the user performs a slide operation with a finger to slide the second touch display unit 21 to the right, the control unit 100 determines whether there is information divided displayed between the first touch display unit 11 and the second touch display unit 21 to detect the divided information, i.e., the words "(Mon.) and "umbrella" and an image of a cloud. The control unit 100 slides the display of the whole screen of the second touch display unit 21 to the right in the direction of the slide operation by an amount corresponding to the amount of the slide operation, and deletes, from the first touch display unit 11, information, i.e., parts of the words "(Mon.) and "umbrella" and an image of a cloud, dividedly displayed in the first touch display unit 11. Then, the control unit 100 slides the display of the whole screen of the second touch display unit 21 to move the display to the second touch display unit 21 in order to display the whole of the divided information, i.e., the whole words "(Mon.) and "umbrella" and an image of a cloud in the second touch display unit 21.

This enables the user to check the whole of the divided information, i.e., the whole words "(Mon.) and "umbrella" and an image of a cloud in the second touch display unit 21.

When the finger is in contact with the second touch display unit 21 in the slide operation, the control unit 100 maintains the state where the display of the whole screen is slid. Then, when the user releases the finger from the second touch display unit 21, the control unit 100 returns the display of the whole screen to the screen display before being slid (display example 205).

When the first touch display unit 11 is slid to the left, the display of the whole screen of the first touch display unit 11 may be slid to display the divided information in the first touch display unit 11.

In Example 2, when the predetermined operation is detected, the display of the whole screen of one of the first touch display unit 11 and the second touch display unit 21 is slid. This is effective in sliding the center position of display information on one screen.

FIG. 7 is a diagram illustrating a display example to describe another example of Example 2 of one screen display control performed by the control unit 100. In the example illustrated in FIG. 6 mentioned above, the example is illustrated, in which information dividedly displayed on the screen of one touch display unit is deleted from the first touch display unit 11, and moved to the screen of the other (slid side) touch display unit to display the whole of the divided information thereon. On the other hand, in the example of FIG. 7, only the whole screen of the other (slid side) touch display unit is slid while leaving the screen display of one touch display unit intact to display the whole of the divided information in the other (slid side) touch display unit.

In a display example 207 of FIG. 7, the displayed information is the same as that in the display example 205 of FIG. 6. As illustrated in a display example 208, when the user performs a slide operation with a finger to slide the first touch display unit 11 to the right, the control unit 100 slides the display of the whole screen of the second touch display unit 21 to the right in the direction of the slide operation by an amount corresponding to the operation amount of the slide operation to display the whole of the divided information, i.e., the whole words "(Mon.) and "umbrella" and an image of a cloud, in the second touch display unit 21. At this time, the control unit 100 maintains the screen display of the first touch display unit 11, and displays, in the first touch display unit 11, the information dividedly displayed in the first touch display unit 11, i.e., parts of the words "(Mon.) and "umbrella" and an image of a cloud, without any change.

When the finger is in contact with the second touch display unit 21 in the slide operation, the control unit 100 maintains the state where the display of the whole screen is slid. Then, when the user releases the finger from the second touch display unit 21, the control unit 100 returns the display of the whole screen to the screen display in its pre-slide state (display example 207).

The other example of Example 2 is effective in checking the whole of divided information in one touch display unit while maintaining the screen display of the other touch display unit.

In Examples 1 and 2 mentioned above, the predetermined operation is not limited to that described above, and it may be any other operation. For example, when a multi-tap operation with a finger to one touch display unit is performed, the control unit 100 provides a display as if display information is floating (floating display). Then, when a slide operation with one or more fingers to the one touch display unit is performed, the control unit 100 may slide the display of the whole screen, while when the finger(s) is released from the one touch display unit, the control unit 100 may return the screen display to the original display.

In the aforementioned embodiments and Examples 1 and 2, the examples of displaying one screen in the landscape orientation are described, but the present embodiment can also be applied to a case where one screen is displayed in the portrait orientation.

What is claimed is:

1. An information processing apparatus comprising:
   a first display unit and a second display unit, wherein at least one of the first display unit and the second display unit is a touch panel display unit;
   a processor;
   a memory that stores code executable by the processor to:
      control a first screen display of the first display unit and a second screen display of the second display unit;
      detect an instruction to slide at least one of the first screen display and the second screen display, wherein the instruction is a swipe with one or more fingers on at least one of the first screen display and the second screen display, the swipe having a first direction and a first distance, and a second direction of sliding the at least one of the first screen display and the second screen display corresponds to the first direction of the swipe and a second distance of sliding the at least one of the first screen display and the second screen display corresponds to the first distance of the swipe;
      in response to detecting the instruction, slide the at least one of the first screen display and the second screen display;
      detect, an information unit displayed dividedly between the at least one of the first screen display and the second screen display; and
      display the information unit undividedly within one of the first screen display and the second screen display corresponding to the first direction of the swipe in response to i) detecting the instruction and ii) the detection of the information unit displayed dividedly between the at least one of the first screen display and the second screen display.

2. The information processing apparatus of claim 1, wherein sliding the at least one of the first screen display and the second screen display comprises sliding the first screen display and the second screen display together.

3. The information processing apparatus of claim 1, wherein the code is further executable by the processor to:
   retain an original position of the first screen display and the second screen display in response to the one or more fingers being in contact with one of the first screen display and the second screen display during the swipe; and
   return the first screen display and the second screen display to the original position in response to the one or more fingers being released from one of the first screen display and the second screen display.

4. The information processing apparatus of claim 3, further comprising a sliding screen display that comprises the first screen display and the second screen display.

5. The information processing apparatus of claim 1, further comprising:
   a first chassis adapted to house the first display unit;
   a second chassis adapted to house the second display unit; and a hinge adapted to couple the first chassis and the second chassis rotatably.

6. A method comprising:
controlling a first screen display of a first display unit and a second screen display of a second display unit, wherein at least one of the first display unit and the second display unit is a touch panel display unit;
detecting an instruction to slide at least one of the first screen display and the second screen display, wherein the instruction is a swipe with one or more fingers on at least one of the first screen display and the second screen display, the swipe having a first direction and a first distance, and a second direction of sliding the at least one of the first screen display and the second screen display corresponds to the first direction of the swipe and a second distance of sliding the at least one of the first screen display and the second screen display corresponds to the first distance of the swipe;
in response to detecting the instruction, sliding the at least one of the first screen display and the second screen display;
detecting an information unit displayed dividedly between the at least one of the first screen display and the second screen display; and
displaying the information unit undividedly within one of the first screen display and the second screen display corresponding to the first direction of the swipe in response to i) detecting the instruction and ii) the detection of the information unit displayed dividedly between the at least one of the first screen display and the second screen display.

7. The method of claim 6, wherein sliding the at least one of the first screen display and the second screen display comprises sliding the first screen display and the second screen display together.

8. The method of claim 6, further comprising:
retaining an original position of the first screen display and the second screen display in response to the one or more fingers being in contact with one of the first screen display and the second screen display during the swipe; and
returning the first screen display and the second screen display to the original position in response to the one or more fingers being released from one of the first screen display and the second screen display.

9. The method of claim 8, wherein a sliding screen display comprises the first screen display and the second screen display.

10. The method of claim 6, further comprising:
adapting a first chassis to house the first display unit;
adapting a second chassis to house the second display unit; and
adapting a hinge to couple the first chassis and the second chassis rotatably.

11. A program product comprising a non-transitory computer readable storage medium that stores code executable by a processor, the executable code comprising code to perform:
controlling a first screen display of a first display unit and a second screen display of a second display unit, wherein at least one of the first display unit and the second display unit is a touch panel display unit;
detecting an instruction to slide at least one of the first screen display and the second screen display, wherein the instruction is a swipe with one or more fingers on at least one of the first screen display and the second screen display, the swipe having a first direction and a first distance, and a second direction of sliding the at least one of the first screen display and the second screen display corresponds to the first direction of the swipe and a second distance of sliding the at least one of the first screen display and the second screen display corresponds to the first distance of the swipe;
in response to detecting the instruction, sliding the at least one of the first screen display and the second screen display;
detecting an information unit displayed dividedly between the at least one of the first screen display and the second screen display; and
displaying the information unit undividedly within one of the first screen display and the second screen display corresponding to the first direction of the swipe in response to i) detecting the instruction and ii) the detection of the information unit displayed dividedly between the at least one of the first screen display and the second screen display.

12. The program product of claim 11, wherein sliding the at least one of the first screen display and the second screen display comprises sliding the first screen display and the second screen display together.

13. The program product of claim 11, the code further:
retaining an original position of the first screen display and the second screen display in response to the one or more fingers being in contact with one of the first screen display and the second screen display during the swipe; and
returning the first screen display and the second screen display to the original position in response to the one or more fingers being released from one of the first screen display and the second screen display.

14. The program product of claim 13, wherein a sliding screen display comprises the first screen display and the second screen display.

* * * * *